Jan. 22, 1924.  
C. W. BECK  
1,481,532  
STEERING WHEEL  
Original Filed Sept. 20, 1922  2 Sheets-Sheet 2

Inventor  
Charles W. Beck

Patented Jan. 22, 1924.

1,481,532

UNITED STATES PATENT OFFICE.

CHARLES W. BECK, OF DETROIT, MICHIGAN, ASSIGNOR TO BECK-FROST CORPORATION, OF DETROIT, MICHIGAN, A CORPORATION OF MICHIGAN.

STEERING WHEEL.

Original application filed September 20, 1922, Serial No. 589,475. Divided and this application filed May 21, 1923. Serial No. 640,590.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles, boats and the like, but refers particularly to wheels wherein the spider or metal part is preferably of the built-up and assembled type.

An object of the invention is to provide a strong and durable steering wheel in which the metal parts of the spider are rigidly secured together by simple and effective means.

Another object is to provide a strong and durable wheel which is simple in construction and which can be manufactured at a comparatively low cost.

With the above and other objects in view, the invention consists of certain novel features of construction, combination and arrangement of parts as will be more fully described and particularly pointed out in the appended claims.

This application is a division of my co-pending application, Serial No. 589,475, filed September 20, 1922, for steering wheel and method of forming the same.

In the accompanying drawings:—

Figure 1 is a top plan view of a steering wheel embodying my invention;

Figure 2 is a sectional view taken on line 2—2 of Figure 1;

Figure 3:
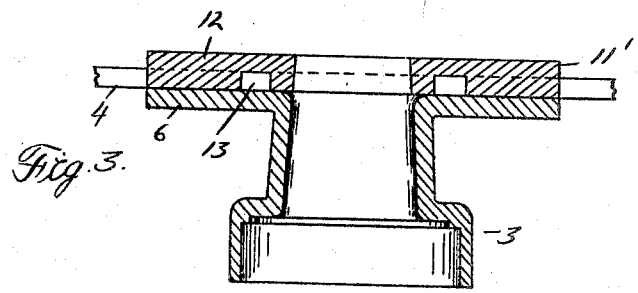
Figure 3 is a detail sectional view taken on line 3—3 of Figure 1.
Figure 4:
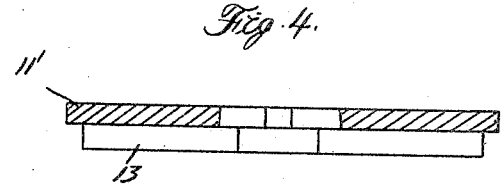
Figure 4 is a detail sectional view of the cover plate.
Figure 5:
Figure 6:
Figure 7:
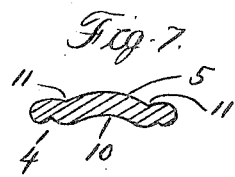

Figure 5, 6 and 7 are detail sectional views taken on lines 5—5; 6—6; and 7—7 respectively of Figure 1.

Referring now to the drawings in which like characters of reference designate corresponding parts throughout the several views, the numeral 1 designates a rim, preferably of wood, supported upon a spider 2 which includes a hub 3 and a plurality of radially extending arms 4. The hub and arms may be constructed of any suitable material and are preferably of the shape shown.

The arms 4 are preferably provided at their outer ends with ribbed portions 5 which are embedded in the rim 1 and at their inner ends are preferably arranged in contacting relation and are riveted to an annular flange 6 which is preferably formed integral with the upper end thereof. The contacting edges 7 of the arms are preferably straight and are preferably located in planes that are disposed at right angles to each other, while the extreme inner ends of the arms between the contacting edges are preferably curved as shown at 8 to form an annulus corresponding in diameter to the diameter of the hub.

The arms 4 preferably curve upwardly from the hub throughout a portion of their length and then extend horizontally as shown at 9. The upwardly extending portion of each arm is preferably curved transversely as shown in Figure 6 while the horizontally extending portion of each arm is curved as shown at 10 and is provided with parallel longitudinally extending grooves 11.

For concealing the joints between the arms and for reinforcing the spider construction, I preferably provide an annular cover plate 11' which has segmental portions 12 that rest upon the annular flange 6 and which is also provided with radially extending grooves 13 between the segmental portions that receive the arms 4. The cover plate is preferably an aluminum casting and is preferably secured to the annular flange 6 by means of rivets 13' that extend through the arm 4.

In the process of construction the outer ends of the arms 4 are fitted into the sockets 5 in the rim and the inner ends of the arms are subsequently riveted to the arms 6. The cover plate 11 is then riveted to the flange 6 and the finished wheel is produced.

Should it be desired to construct the rim of rubber composition or other suitable material, the spider is built up first to receive the rim. For instance, in the process of construction the arms 4 are assembled on the flange 6 and are then riveted thereto. Following the riveting operation the cover plate 11 is riveted to the flange 6. The rim 1 is then cast upon the outer ends of the arms and the finished wheel is produced.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. A steering wheel comprising a hub having an integral flange at one end, radially extending arms arranged upon said flange, a rim carried by said arms, means for securing said arms to said flange, a cover plate concealing the joints between said arms and having portions engaging said flange, and means extending through said arms for securing said plate, arms, and flange together.

2. A steering wheel comprising a hub having an integral flange at one end, radially extending arms arranged upon said flange, a rim carried by said arms, means for securing said arms to said flange, a cover plate concealing the joints between said arms, said plate having segmental portions engaging said flange and having radially extending grooves between said segmental portions receiving said arms, and means for securing said plate, arms and flange together.

3. In a steering wheel, a hub having a flange, radially extending arms engaging said flange, a cover plate concealing the joints between said arms and having portions engaging said flange between said arms, and means for securing said flange, arms and cover plate together.

In testimony whereof I affix my signature.

CHARLES W. BECK.